United States Patent [19]

Lucero et al.

[11] Patent Number: 5,139,544

[45] Date of Patent: Aug. 18, 1992

[54] GAS-LIQUID CONTACT COLUMN WITH IMPROVED MIST ELIMINATOR AND METHOD

[75] Inventors: Bernardo Y. Lucero, Hudson, Ohio; Neil Yeoman, Merrick, N.Y.

[73] Assignee: Koch Engineering Company, Inc., Wichita, Kans.

[21] Appl. No.: 601,909

[22] Filed: Oct. 22, 1990

[51] Int. Cl.$^5$ .............................. B01F 3/04
[52] U.S. Cl. ........................ 55/257.2; 261/97; 261/112.2
[58] Field of Search ............. 261/97, 112.2, 94, 96; 55/257.2

[56] References Cited

U.S. PATENT DOCUMENTS

| | | | |
|---|---|---|---|
| 2,946,726 | 7/1960 | Markels, Jr. | 261/97 |
| 3,448,038 | 6/1969 | Pall et al. | 261/97 |
| 3,466,151 | 9/1969 | Sicard et al. | 261/112.2 |
| 3,785,620 | 1/1974 | Huber | 261/94 |
| 3,947,532 | 3/1976 | Skold et al. | 261/112.2 |
| 4,031,180 | 6/1977 | Bohanon | 261/112.2 |
| 4,094,936 | 6/1978 | Baujin | 261/97 |
| 4,405,533 | 9/1983 | Norback et al. | 261/112.2 |
| 4,499,031 | 2/1985 | Sexton et al. | 261/112.2 |
| 4,842,778 | 6/1989 | Chen et al. | 261/97 |
| 4,917,935 | 4/1990 | Kubicek | 261/112.2 |
| 4,994,210 | 2/1991 | Lucero et al. | 261/97 |

OTHER PUBLICATIONS

Norton Bulletin, "Packed Tower Internals", cpr 1974-1977, 21 pgs. 261-97.
"Flexeramic TM Structures Ceramic Packing", Bulletin KCP-1, Koch Engineering Company, Inc., Knight Division, 1989.

Primary Examiner—Tim Miles
Attorney, Agent, or Firm—Richard P. Crowley

[57] ABSTRACT

A gas-liquid column and method having improved mist elimination particularly for the treatment of corrosive fluids which comprises directly introducing a liquid from a liquid distributor resting on a top structured packing layer into the upright flow passage of the structured packing to provide the initial gas-liquid contact within the top structured packing layer, thereby reducing mist and spray and particularly useful where corrosive fluids are used.

19 Claims, 1 Drawing Sheet

GAS-LIQUID CONTACT COLUMN WITH IMPROVED MIST ELIMINATOR AND METHOD

BACKGROUND OF THE INVENTION

Packed gas-liquid contact towers for the contacting of a gas and a liquid are used in various treating and chemical operations, such as to include, but not be limited to: distillation, absorption, scrubbing, stripping and other operations and usually contain a liquid distribution means to distribute a downwardly flowing liquid generally uniformly over the upper surface of packing in the column. The packing may be random, that is, dumped, packing or structured packing or a combination thereof. Gas-liquid contact towers are employed for example for the contacting of and in processes using corrosive fluids, such as gases and liquids as in absorption towers used in the manufacture of sulfuric acid. A gas-liquid absorption contact tower is used to absorb sulfur trioxide from an ascending gas stream containing sulfur trioxide by counter current contact with a descending liquid stream of a relatively dilute sulfuric acid which acts as an absorption liquid stream. The dilute sulfuric acid absorbing liquid is introduced into the upper portion of the column and into a distributor, generally a main tubular or trough distributor having a plurality of extending arms with vertical distributor tubes with the ends of the vertical tubes extending to and buried within random packing generally smaller in size than the random packing used in the column proper for the gas-liquid contact. The employment of the smaller random packing about the ends of the vertical liquid distribution tubes is done to minimize splashing of the corrosive liquid and the formation of sprays and mists and to eliminate any mist formed, that is, sulfuric acid entrained droplets in the sulfur trioxide gas leaving the surface of the packed bed.

In such operations due to the highly corrosive nature of the gas and liquid, the packing is a random packing of ceramic-type material, that is, for example, ceramic rings or saddles which may range in size for example of about three inches for the main portion of the packing in column, while the random packing employed to bury the tube ends is typically about 1½ to 2 inches in size. The tubular liquid distributor is usually constructed of heavy cast iron to provide corrosion allowance or exotic-type metal to resist corrosion from the corrosive liquid spray or mist. The tubular distributor which contains a plurality of generally vertical liquid distribution tubes, for example, one to four per square foot of the column cross section, are designed to deliver the sulfuric acid scrubbing liquid directly on to the top surface of the random ceramic packing so as to avoid splashing and sulfuric acid misting.

It is desirable, particularly in gas-liquid contact of corrosive fluids, such as in the manufacture of sulfuric acid, hydrogen chloride and other corrosive liquid materials, to provide a new and improved method and structure to reduce spray and mist and also to permit the use of a distributor that is corrosive-resistant at a reasonable cost to avoid the use of expensive, heavy or exotic metal liquid distributors. Therefore, it is desirable to provide for an improved gas-liquid column with improved spray and mist elimination and a method of reducing spray and mist generation with corrosive fluids in a gas-liquid contact column.

SUMMARY OF THE INVENTION

The invention relates to a gas-liquid contact column with improved mist eliminator and to a method of reducing fluid spray and mist generation, particularly of corrosive fluids, in a packed gas-liquid column. In particular the invention concerns a structured plate-type packing gas-liquid contact column with a liquid distributor to reduce spray and mist generation problems and to permit the employment of a less expensive, corrosion-resistant distributor.

The packed gas-liquid column of the invention includes a layer of a structured-type packing in the upper portion thereof and a plurality of trough-type liquid distributors, with the bottom surface of the distributor placed directly on the top surface of structured packing layer and with the distributors having holes in the bottom surface so as to deliver the liquid from the distributor directly into the flow passages of the structured packing. Typically, the trough-type distributor has a plurality of generally uniformly spaced holes in a flat, horizontal bottom and generally is composed of a corrosion-resistant material, such as a plastic or ceramic material, with the flat bottom surface laid directly onto the top of the supported bed of the structured packing layer. The distributor on the packing blocks a portion of the packing top surface so that the upwardly ascending gas flow is diverted away from the blocked region where the liquid from the distributor enters the structured packing as it exits from the bottom surface of the distributor, so that the first liquid-gas contact occurs several inches, for example, about more than two inches, e.g. 2 to 6 inches, inside the structured packing layer. Any mist or spray formed by the liquid distribution within the packing admixes with the rising gas stream, while the upwardly rising gas stream still has a way to go before it exits the top surface of the structured packing layer. The upper portion of the upper packing layer therefore functions as a mist and spray eliminator.

Optionally and where required if additional depth of a mist eliminator layer is required, the spaces between the trough distributors and between the distributors and the sides of the column may be fitted with additional structured packing of the same or different size, so that as the upward gas stream exits the top surface of the structured packing layer just below the distributors and flows through the spaces between the distribution troughs, it again passes through a packing specifically provided and designed for the removal of spray and mist. The gas-liquid column and method provides a positive and unique approach to the elimination of spray and mist problems, particularly for corrosive fluids in gas-liquid contact, and particularly in the manufacture of acids or acid-containing materials, for example, sulfuric acid.

The employment of the upper layer of structured packing ensures that the initial gas and liquid contact will be initially substantially below the top surface of the structured packing layer. This method avoids the use of small random-type packing and the associated problems, such as the smaller packing migrating into the voids of the lower packing, thereby reducing throughput and increasing pressure drop. The gas-liquid column and method also allow the use of a section of packing, that is, a packing layer of structured, e.g. plate or lamella, quality, that is specifically designed for mist and spray elimination, while the remaining and lower layers of the packing, either structured or random or a combination, may be designed for the purposes of the gas-liquid tower, that is, gas-liquid contact. Also the gas-liquid column and method permits the employment of distributors that are truly corrosion resistant at a reasonable cost and avoids the necessary employment of expensive, heavy, cast or exotic-type metal distributors presently employed in corrosive fluid gas-liquid contact operations and reduces the downtime and cost associated with the use and periodic replacement of metal distributors.

A wide variety of liquid distributors can be employed in the practice of the invention, and for example, may be corrosion-resistant liquid distributors preferably of ceramic, that is, porcelain or stoneware, or plastic, and generally comprise a main distributor with a plurality of generally uniformly spaced apart, parallel distribution troughs extending from the main distributor, across substantially the entire upper surface of the underlying top structured packing layer, so that the downwardly flowing liquid to be employed may be generally uniformly distributed across the structured packing layer and directly onto the top surface. The liquid distributor should have a flat bottom surface of generally rectangular construction with a plurality of spaced apart holes in the bottom surface, with the holes generally extending downward and generally aligned so as to direct the downwardly flowing liquid directly onto and into the generally vertical flow passages in the structured packing layer below. While a wide variety of trough-type distributors may be employed with the holes on the flat, horizontal bottom surface, one suitable ceramic trough-type distributor is disclosed for example in U.S. patent application Ser. No. 07/487,191, filed Mar. 1, 1990, now U.S. Pat. No. 4,994,210 (see particularly FIGS. 1 and 3) hereby incorporated by reference. The number, shape, position and size of the holes may very depending upon the particular operation and the liquid flow desired.

The structured packing layer is disposed as the top upper structured packing layer in the column and should be designed to reduce or eliminate mist and spray and typically should be formed of a corrosion-resistant material, particularly of a plastic or ceramic-type material. The liquid from the bottom surface of the liquid distributor should enter the flow passages of the structured packing layer directly so as to avoid gas-liquid contact in the upper reaches of the structured packing layer. The distributor and aligned packing should permit gas-liquid contact, for example, about two to four or more inches, below the top surface of the structured packing layer, thereby avoiding the forming of corrosive spray and mist. The depth of the structured packing layer may vary, for example, but not limited to about 2 to 24 inches, e.g. 4 to 12 inches, and the structured packing layer may be the same or different than structured packing layers downwardly employed in the column, or the column may if desired, though not typically also contain random dumped packing. Generally, the gas-liquid contact column would contain several layers of structured packing generally of alternating sequence and arrangement to provide for good gas-liquid contact.

One form of structured packing layer suitable for the purpose of the invention comprises structured packing composed of a plurality of corrugated lamellas or plates with the corrugations of the adjacent lamellas oriented in different directions and arranged to form generally axial, vertical, upright flow passages. Adjacent packing elements are angularly offset from each other, all of which are described for example in U.S. Pat. No. 3,785,620, hereby incorporated by reference in its entirety. Generally, such structured packing which is composed of layers on which the distributor trough sits is designed so that the flow passages are generally vertical, and so that the liquid emanating from the bottom surface of the horizontal troughs will flow directly into the vertically extending flow passages, while adjacent and lower layers may be typically offset for improved gas-liquid contact. Suitable structured packing comprises a ceramic, corrugated structured packing known as FLEXERAMIC (a trademark of Koch Engineering, Inc. of Wichita, Kans.).

Optionally, but desirably, depending upon the efficiency of the spray and mist elimination by the top structured packing layer, additional packing and preferably structured packing of the same or similar type as the structured packing in the top layer on which the distributor troughs rest may be employed between the distributor troughs and also between the distributor troughs and the sides of the column at a desired depth, such as for example, 2 to 12 inches or more, to further reduce mist and spray. It is recognized that between the troughs and between the troughs and the sides of the column other types of mist eliminator devices may be used, such as different structured packings, random packings, fibers and mesh of corrosion-resistant materials and have suitable hydraulic capacity.

The longitudinal axis of the distribution troughs and the plane of the lamellas or sheets of the structured packing may be at various angles to each other. However, generally for distribution purposes, the preferred arrangement is for the axis of the distribution troughs to be generally perpendicular to the plane of the structured packing of the top layer of the packing, while for mechanical and hydraulic purposes, the plane of the lamellas packing between the distribution troughs is parallel to the axis of the troughs.

In the prior art technique where the distributor tubes are buried in the random packing, the liquid exiting the buried tubes encounters varying degrees of obstruction depending upon the random physical relationship of the tube ends and the packing adjacent the tube ends, so the quality of distribution varies and suffers. The employment of the aligned distribution trough with liquid diverted into the flow passages of the structured packing avoids variation in distribution. Further, as the liquid exits the tube ends, it impinges on the random packing at varying angles. Liquid impacting on a horizontal-type surface generates mist, while on a vertical surface, as when the liquid flow is channelled directly from the holes in the distributor troughs into the vertical flow passages, mist generation is diminished.

The gas-liquid column and method is suitable for use in a variety of operations, including, but not limited to corrosive and toxic gases and liquids, such as, but not limited to, sulfuric acid absorption, hydrogen chloride absorption, plating solution concentrations, chlorinators, acid-gas scrubbing and removal, purification of organic acids and bromine and chlorine testing and stripping operations.

The invention will be described for the purposes of illustration only in connection with certain embodiments; however, it is recognized that various changes, additions, improvements and modifications may be made by those skilled in the art to the illustrated embodiments, all falling within the spirit and scope of the invention.

DESCRIPTION OF THE EMBODIMENTS

Figure 1:
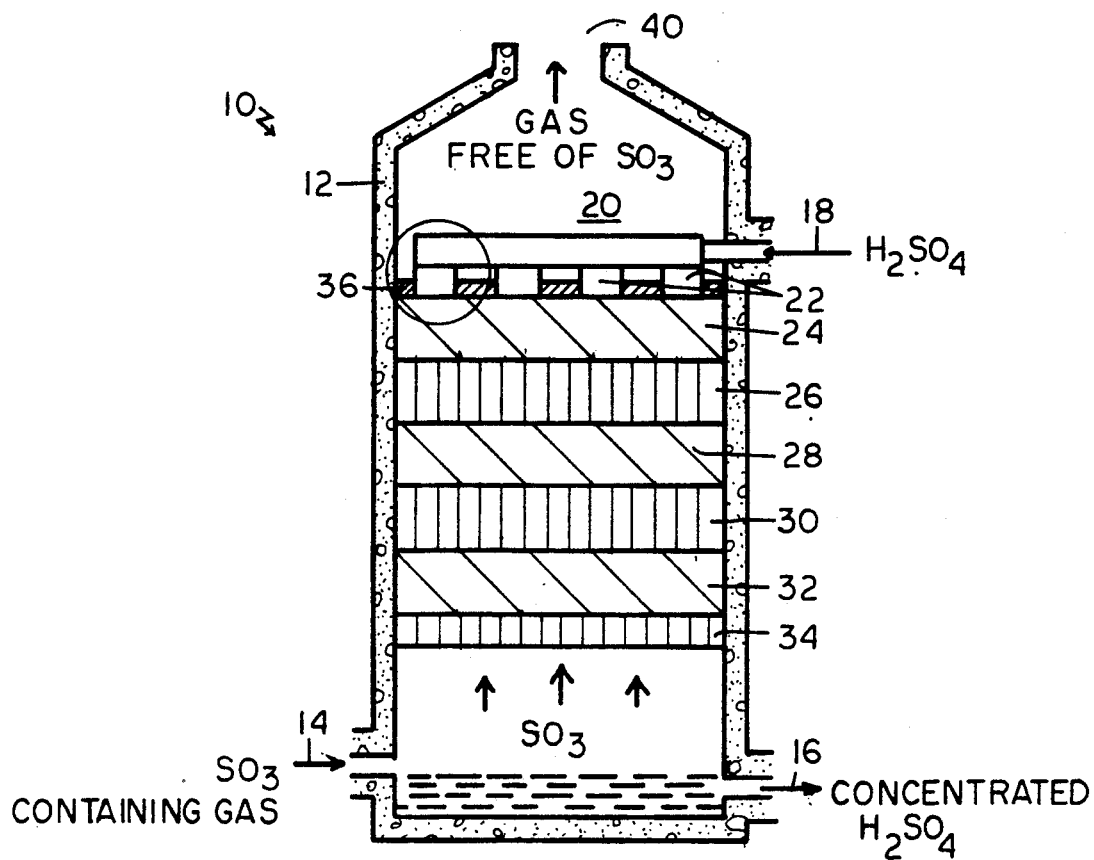
FIG. 1 is vertical, sectional, illustrative view of the gas-liquid contact of the invention.

FIG. 1 shows a gas-liquid contact tower 10 comprising a column shell 12 having a lower inlet 14 for the introduction of a sulfur trioxide-containing ($SO_3$) gas; an upper inlet 18 for the introduction of a dilute sulfuric acid ($H_2SO_4$) liquid to be concentrated into a main liquid predistributor 20 feeding a plurality of generally parallel, separated troughs 22, each having a flat bottom surface. Each distributor 22 with a plurality of generally uniformly spaced and sized holes 38 in the bottom surface for the controlled distribution of the downwardly flowing dilute sulfuric acid from inlet 18. The column shell 12 contains a lower outlet 16 for the removal of concentrated sulfuric acid ($H_2SO_4$) formed by the absorption of the $SO_3$ from the $SO_3$-containing gas into the dilute $H_2SO_4$, and an upper gas discharge outlet 40 for the discharge of a gas essentially free of the $SO_3$.

The column shell 12 includes a lower packing support grid 34 and a plurality of layers of structured-type packing 24, 26, 28, 30 and 32 with each layer having a different flow passage orientation to the adjacent layer and a depth of 6 to 12 inches. Each layer is a ceramic structured packing composed of a plurality of lamellas, for example, that is known as FLEXERAMIC TM structured packing. Layer 24 is illustrated as showing the generally vertical, corrugated formed flow channels between the corrugated sheets of the lamellas in a generally vertical, upright position and with the flat bottom surface of the horizontal, rectangular distribution troughs 22 resting directly onto the top surface of the structured packing layer 24. The longitudinal axis of the distribution troughs 22 are perpendicular to the plates of the packing layer 24. The holes 38 of the structured packing are disposed substantially over the upright flow passages of packing layer 24. Additional structured packing 36, e.g. of 2 to 6 inches in depth, of a ceramic material, e.g. FLEXERAMIC TM, is disposed so that the plates are parallel to the longitudinal axis of the troughs 22 and is placed between the individual troughs 22 and between the inner wall of the column shell 12 and the troughs 22 to serve as an additional mist eliminator.

In operation, an upwardly ascending sulfur trioxide-containing gas is introduced through inlet 14 and passes upwardly in the column through the support grid 34 and through the structured packing layers 32-24 and is contacted by the downwardly flowing dilute sulfuric acid introduced into inlet 18 and through predistributor 20 and distributor troughs 22 and holes 38 to the upper packing layer 24, so that the downward flowing liquid is engaged in gas-liquid contact with the upwardly ascending gas containing $SO_3$. A more concentrated sulfuric acid is produced by the absorption of the $SO_3$ into the dilute $H_2SO_4$ which is removed from the outlet 16 while the gas essentially free of absorbed $SO_3$ is discharged from outlet 40. Since the bottom surface of the distributors 22 sit directly on the top surface of the structured packing layer 24, the distributor increases the number of direct distribution points and reduces entrainment by redirecting the gas to the side of the distributor trough 22 as illustrated by the arrows in FIG. 2 causing initial contact to be some depth into the bed. This avoids the problems of current technology where smaller random packing is used to bury the liquid distributor tubes to eliminate splashing and misting.

Figure 2:
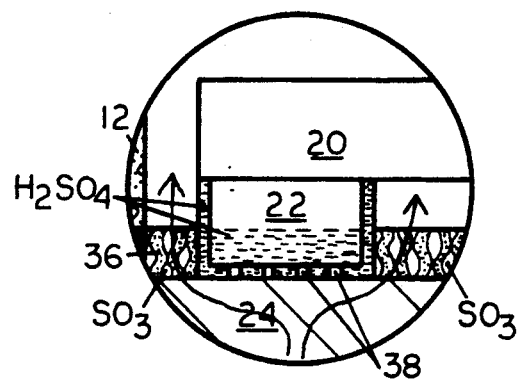
FIG. 2 is an enlarged, fragmented, sectional view of a portion of the upper layer of the gas-liquid column of FIG. 1.

FIG. 2 is a fractional, enlarged, schematic of a portion of the gas-liquid column of FIG. 1 and illustrates the packing layer 24 with the generally upright flow channels and with the holes 38 in the bottom surface of the trough 22 directly distributing the dilute sulfuric acid into the vertically upright flow channels of the packing 24 so that initial gas-liquid contact occurs within the flow channels at a depth of 2 to 4 inches. The gas flow arrows illustrate generally the upward gas flow pattern with the bottom of the distributor, directing the gas to the sides thereof, so that the structured packing layer 36 on either side of the distributors 22 provides additional mist elimination.

As illustrated and disclosed, the trough-type liquid distributors 22 sit directly onto a top surface of the structured packing layer 24 and reduces the formation of sulfuric acid and mists and spray, permits the use of less expensive, corrosion-resistant distributors and avoids problems associated with the gas-liquid contact of corrosive fluids as in the prior art.

What is claimed is:

1. In gas liquid contact column which comprises:
   a) a column having an inlet at the lower portion thereof for the introduction of an upwardly flowing gas stream;
   b) an inlet at the upper portion thereof for the introduction of a downwardly flowing liquid;
   c) an outlet at the upper portion for the withdrawing of a liquid-treated gas stream;
   d) an outlet in the lower portion of the column for the withdrawing of a gas-treated liquid stream, the column containing packing elements therein to promote gas-liquid contacting; and
   e) a liquid distributor to distribute liquid from the liquid inlet to the packing elements, the improvement which comprises:
      i) a top upper packing layer comprising a structured packing disposed substantially across the column diameter and having a top surface and a plurality of lamellas forming generally upright flow channels therein extending to the top surface;
      ii) a plurality of generally parallel, spaced apart, trough liquid distributors each having a generally flat bottom surface with liquid distribution holes therein and disposed generally across the substantial diameter of the column to distribute a liquid directly onto the top surface of the structured packing layer; the bottom surface of the liquid distributor directly resting on the top surface of the structured packing layer to block a portion of the top surface of the packing layer so that the upwardly flowing gas stream is diverted toward each side of the liquid distributor, and the liquid distributor holes generally aligned with the flow channels of the packing whereby liquid introduced into the inlet and distributed from the liquid distributor through the holes in the bottom surface is directly introduced into the flow passages of the structured packing layer to reduce the production of mist and spray as the liquid and vapor first come into contact.

2. The gas-liquid column of claim 1 wherein the column consists essentially of a plurality of structured packing layers as the packing elements of the column.

3. The gas-liquid column of claim 1 wherein the liquid distributor comprises a plurality of generally rectangular-shaped ceramic or plastic liquid distribution troughs having flat bottom surfaces resting directly on the top surface of the top structured packing layer.

4. The gas-liquid column of claim 1 wherein the upper layer of the structured packing has a layer thickness of about 2 to 24 inches.

5. The gas-liquid column of claim 1 wherein the packing elements are composed of a plurality of layers of structured packing composed of a plurality of lamellas in contact with each other, each lamella having corrugations thereon with the corrugations of adjacent lamellas being oriented in different directions and with the lamellas in each of the layers being disposed at an angle to the lamellas of adjacent layers.

6. The gas-liquid column of claim 1 wherein the longitudinal axis of the trough distributor is generally perpendicular with the plane of the lamellas.

7. The gas-liquid column of claim 1 which includes an additional layer of packing material between the sides of the liquid distribution troughs and between the troughs and sides of the column to provide for a mist elimination layer.

8. The gas-liquid column of claim 7 wherein the packing material comprises a ceramic-type structured packing material comprising a plurality of lamellas forming generally upright flow passages, the plane of the lamellas generally parallel to the longitudinal axis of the distributors.

9. The gas-liquid column of claim 8 wherein the ceramic structured packing material has a depth of about 2 to 12 inches.

10. In a gas-liquid contact column which comprises:
a) a column having an inlet at the lower portion thereof for the introduction of an upwardly flowing gas stream;
b) an inlet at the upper portion thereof for the introduction of a downwardly flowing liquid;
c) an outlet in the lower portion of the column for the withdrawing of a gas-treated liquid stream, the column containing packing elements therein to promote gas-liquid contacting; and
d) a liquid distributor to distribute liquid from the liquid inlet to the packing elements, the improvement which comprises:
i) a top upper packing layer comprising a structured packing disposed substantially across the column diameter and having a top surface and a plurality of lamellas in contact with each other, each lamella having corrugations thereon with the corrugations of adjacent lamellas being oriented in different directions and with the lamellas in each of the layers being disposed at an angle to the lamellas of adjacent layers and defining generally upright flow passages;
ii) a plurality of generally parallel, spaced apart, trough liquid distributors each having a generally flat bottom surface with a plurality of liquid distribution holes therein and disposed generally across the substantial diameter of the column, the bottom surface of the liquid distributor directly resting on the top surface of the structured packing layer, the holes of the liquid distributors generally aligned with the flow passages of the structured packing layer to distribute a liquid directly into the flow passages of the structured packing layer;
iii) the longitudinal axis of the liquid distributor troughs are generally perpendicular to the plane of the lamellas of the structured packing layer; and
iv) a layer of structured packing material between the sides of the liquid distribution troughs and between the troughs and sides of the column to provide for additional mist elimination.

11. A method of reducing spraying and misting in a gas-liquid contact tower, which method comprises:
a) directly placing the bottom surface of one or more trough-type liquid distributors having generally flat bottom surfaces and having holes in the bottom surface therein directly onto the top surface of a top upper layer of a structured packing material to block a portion of the top surface of the packing material wherein the packing material comprises a plurality of lamellas forming a plurality of generally upright flow passages therein:
b) generally aligning the holes of the distributors with the flow passages; and
c) flowing the liquid from the trough-type distributor through the holes in the bottom surface and directly into the upright flow passages of the structured packing, while passing an upwardly ascending gas stream through the structured packing layer so that the liquid is introduced directly into the interior of the flow passages and diverting the upward ascending gas stream away from the blocked portion of the packing material whereby the formation of spray and mist of the downwardly flowing liquid by the upwardly flowing gas is reduced and the contact of the downwardly flowing liquid and the upwardly flowing gas first occurs substantially within the structured packing layer.

12. The method of claim 11 which includes placing packing material to reduce misting between the sides of the trough-type distributors and between the trough-type distributors and the side walls of the column.

13. The method of claim 11 wherein the structured packing layer comprises a plurality of lamellas in contact with each other, each lamella having corrugations thereon, with the corrugations of adjacent lamellas being oriented in different directions and with the lamellas in each of the layers being disposed at an angle to the lamellas of adjacent layers.

14. The method of claim 11 wherein the structured packing layer has a layer thickness of about 2 to 24 inches.

15. The method of claim 11 which includes aligning the longitudinal axis of the distributors generally perpendicular with the plane of the lamellas and the flow passages.

16. The method of claim 11 which includes introducing an upwardly flowing corrosive acid gas into the bottom portion of the column, introducing a downwardly flowing liquid corrosive acid into the liquid distributor, and withdrawing a treated, concentrated liquid stream from the bottom of the column.

17. The method of claim 16 wherein the gas stream is a sulfur trioxide-containing gas stream, the downwardly flowing liquid is dilute sulfuric acid, and the withdrawn treated stream is concentrated sulfuric acid.

18. The method of claim 11 which includes placing a second structured packing material on the top surface of the upper layer of the structured packing material and between the sides of the distributors and between the sides of the distributors and the sides of the gas-liquid column to form a mist eliminator layer.

19. The method of claim 18 wherein the second structured packing material comprises a plurality of lamellas to define upright flow passages and wherein the plane of the lamellas is positioned generally parallel to the longitudinal axis of the distributors.

* * * * *